US006958394B2

(12) United States Patent
Saito

(10) Patent No.: US 6,958,394 B2
(45) Date of Patent: Oct. 25, 2005

(54) CELLULOSE ESTER FILM

(75) Inventor: Koichi Saito, Hino (JP)

(73) Assignee: Konica Corporation, Tokyo (JP)

(*) Notice: Subject to any disclaimer, the term of this patent is extended or adjusted under 35 U.S.C. 154(b) by 435 days.

(21) Appl. No.: 10/115,293

(22) Filed: Apr. 3, 2002

(65) Prior Publication Data

US 2003/0037703 A1 Feb. 27, 2003

(30) Foreign Application Priority Data

Apr. 25, 2001 (JP) ........................................ 2001-127648
Aug. 21, 2001 (JP) ........................................ 2001-250429

(51) Int. Cl.$^7$ .............................. C08B 3/00; C08B 3/16; A61K 31/715; A01N 43/04
(52) U.S. Cl. .............................. 536/58; 536/63; 536/65; 536/88; 536/89; 536/115; 514/57
(58) Field of Search .............................. 536/58, 63, 65, 536/88, 89, 115

(56) References Cited

U.S. PATENT DOCUMENTS 5,631,078 A * 5/1997 Ellery et al. ........... 428/311.71

* cited by examiner

Primary Examiner—James O. Wilson
Assistant Examiner—Everett White
(74) Attorney, Agent, or Firm—Lucas and Mercanti, LLP

(57) ABSTRACT

A cellulose ester film is disclosed which comprises a polyhydric alcohol ester, which is an ester of one or more kinds of monocarboxylic acids with an aliphatic polyhydric alcohol, wherein the cellulose ester film has a water vapor transmission rate of from 20 to 260 g/m$^2$·24 hours measured under conditions of 25° C. and 90% RH.

10 Claims, No Drawings

CELLULOSE ESTER FILM

FIELD OF THE INVENTION

The present invention relates to a cellulose ester film, and particularly to a cellulose ester film used in a polarizing plate and a polarizing plate protective film.

BACKGROUND OF THE INVENTION

Recently, development has been made regarding decrease in thickness and weight of an information-processing equipment such as a note board type personal computer. In parallel with this development, a polarizing plate protective film used in a liquid crystal display has been eagerly sought to be increasingly thinner. Cellulose acetate film is generally used in the polarizing plate protective film, however, it has been proved that a simple decrease in thickness of the cellulose acetate film produces various problems.

The cellulose triacetate film used in the polarizing plate protective film contains a plasticizer in order to improve film flexibility or a moisture vapor permeation property. However, a simple decrease in thickness of the cellulose triacetate film increases moisture vapor permeability, minimizes water resistance, and occasionally deteriorates a polarizing film or an adhesive used for preparing a polarizing plate. In order to compensate for the decrease in thickness, it is considered to increase an addition amount of the plasticizer in the film in proportion to the thickness decrease. However, it has been found that a simple increase of the plasticizer addition amount does not sufficiently improve the moisture vapor permeation property causes and produces new problems such as retention property deterioration. The weight of the film decreases at high humidity and high temperature due to volatilization or precipitation of additives such as plasticizers. A property that additives such as plasticizers are retained in the film is referred to as a retention property. Conventional cellulose ester films are low in the retention property, which lowers performance of a liquid crystal display employing the cellulose ester film. There is a technique in Japanese Patent O.P.I. Publication Nos. 11-092574 in which citric ester is employed, a technique in Japanese Patent O.P.I. Publication Nos. 11-114445 in which a pentaerythritol ester or a dipentaerythritol ester is employed, a technique in Japanese Patent O.P.I. Publication Nos. 11-246704 in which glyceride is employed, or a technique in Japanese Patent O.P.I. Publication Nos. 12000-63560 in which diglycerin ester is employed. However, these techniques do not sufficiently improve moisture vapor permeation and deteriorate the retention property.

SUMMARY OF THE INVENTION

An object of the invention is to provide a cellulose ester film having an excellent water vapor transmission rate and excellent retention property.

DETAILED DESCRIPTION OF THE INVENTION

The above object of the invention has bee attained by the following constitutions:

1. A cellulose ester film comprising a polyhydric alcohol ester, which is an ester of one or more kinds of monocarboxylic acids with an aliphatic polyhydric alcohol, wherein the cellulose ester film has a water vapor transmission rate of from 20 to 260 g/m²·24 hours measured under conditions of 25° C. and 90% RH.
2. The cellulose ester film of item 1, wherein the cellulose ester film has a retention property of from 0.0 to 2.0%.
3. The cellulose ester film of item 1, wherein the monocarboxylic acid has an aromatic ring or a cycloalkyl ring in its molecular structure.
4. The cellulose ester film of item 1, wherein the aliphatic polyhydric alcohol has a hydroxyl group number of from 2 to 20.
5. The cellulose ester film of item 1, wherein the cellulose ester film has a thickness of from 10 to 65 µm.
6. The cellulose ester film of item 1, wherein the aliphatic polyhydric alcohol is represented by the following formula (1):

$(R_1)—(OH)n$  formula (1)

wherein $R_1$ represents an n-valent aliphatic group; and n represents an integer of not less than 2.

7. The cellulose ester film of claim 6, wherein the n-valent aliphatic group is selected from an alkylene group, an alkenylene group, an alkynylene group, a cycloalkylene group and an alkanetriyl group.
8. The cellulose ester film of item 1, wherein the polyhydric alcohol ester has a molecular weight of from 300 to 1500.
9. The cellulose ester film of item 1, wherein the total number of aromatic rings or cycloalkyl rings in the molecular structure of the polyhydric alcohol ester is not less than 3.

The present invention will be explained in detail below. The present inventor has made an extensive study in order to attain the objects described previously, and as a result, they have succeeded in obtaining a cellulose ester film which provides a satisfactory water vapor transmission rate and an excellent retention property, in spite of reduced thickness of an optical film employing the cellulose ester film.

That is, the above object of the invention has been attained by a cellulose ester film comprising an ester of an aliphatic polyhydric alcohol and one or more of monocarboxylic acids, and having a water vapor transmission rate falling within the range as defined in the invention.

Functions of the polyhydric alcohol ester in the invention are not sufficiently clarified, but it is assumed that the addition amount of the plasticizer can be reduced due to addition of the polyhydric alcohol ester.

Retention property referred to in the invention means a property that additives such as plasticizers in the film are retained in the film without precipitation or volatilization under conditions of high temperature and high humidity. The retention property of the film in the invention is obtained from the following procedures:

A film sample was allowed to stand at 23° C. and at 55% RH (relative humidity) for one day, and weighed. The sample was subjected to heat treatment in which the sample was stored at 80° C. and at 90% RH for two weeks. The resulting sample was again allowed to stand at 23° C. and at 55% RH for one day, and then weighed. The retention property is computed from the following formula:

Retention property (%)=(Film weight before heat treatment−Film weight after heat treatment)×100/Film weight before heat treatment.

The retention property is preferably not more than 2.0%, more preferably not more than 1.0%, still more preferably not more than 0.5%, and most preferably not more than 0.1%.

Water vapor transmission rate referred to in the invention is measured according to a method described in JIS Z 0208 under conditions of 25° C. and 90%.

Next, the polyhydric alcohol ester used in the invention will be explained in detail. The polyhydric alcohol ester herein referred to implies an ester of an aliphatic polyhydric alcohol and one or more monocarboxylic acids.

(Aliphatic Polyhydric Alcohol)

The aliphatic polyhydric alcohol used in the invention implies an alcohol having two or more hydroxyl groups, which is represented by the following formula (1):

$$R_1-(OH)_n \quad \text{Formula (1)}$$

wherein $R_1$ represents an n-valent organic group, and n represents an integer of not less than 2.

Examples of the n-valent organic group include an alkylene group (for example, methylene, ethylene, trimethylene, tetramethylene, etc.), an alkenylene group (for example, ethenylene, etc.), an alkynylene group (for example, ethynylene, etc.), a cycloalkylene group (for example, 1,4-cyclohexanediyl, etc.), and an alkanetriyl group (for example, 1, 2, 3-propanetriyl, etc.). The n-valent organic groups described above include those having a substituent (for example, a hydroxyl group, an alkyl group, a halogen atom, etc.).

"n" represents an integer of preferably from 2 to 20, more preferably from 2 to 15, and most preferably from 3 to 10.

Preferred examples of the polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,3,4-butanetriol, 1,5-pentanediol, 1,6-hexanediol, hexanetriol, galactitol, mannitol, 3-methylpentane-1,3,5-triol, pinacol, sorbitol, trimethylolpropane, trimetylolethane, and xylitol. Triethylene glycol, tetraethylene glycol, dipropylene glycol, tripropylene glycol, sorbitol, trimethylolpropane, and xylitol are especially preferable.

(Monocarboxylic Acid)

The monocarboxylic acids used for the preparation of the polyhydric alcohol ester in the invention are not specifically limited. The monocarboxylic acids include an aliphatic monocarboxylic acid, an alicyclic monocarboxylic acid, and an aromatic monocarboxylic acid, and an alicyclic monocarboxylic acid and an aromatic monocarboxylic acid are preferable in improving water vapor transmission rate and a retention property.

Preferred examples of the monocarboxylic acid include the compounds described later, but the present invention is not limited thereto.

The aliphatic monocarboxylic acid is a straight chained or branched fatty acid having a carbon atom number of preferably from 1 to 32, more preferably from 1 to 20, and most preferably from 1 to 10. Acetic acid is preferable in providing increased compatibility with cellulose ester, and a combined use of acetic acid and another monocarboxylic acid is more preferable.

Preferred examples of the aliphatic monocarboxylic acid include a saturated fatty acid such as acetic acid, propionic acid, butyric acid, valeric acid, caproic acid, enanthic acid, pelargonic acid, capric acid, 2-ethyl-hexane carboxylic acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, heptacosanoic acid, montanic acid, melissic acid or lacceric acid; and an unsaturated fatty acid such as undecylenic acid, oleic acid, sorbic acid, linolic acid, linolenic acid or arachidonic acid. These include those having a substituent.

Preferred examples of the alicyclic monocarboxylic acid include cyclopentane carboxylic acid, cyclohexane carboxylic acid, cyclooctane carboxylic acid, and their derivatives.

Preferred examples of the aromatic monocarboxylic acid include benzoic acid, an alkyl-substituted benzoic acid such as toluic acid, an aromatic monocarboxylic acid having two or more benzene rings such as biphenyl carboxylic acid, naphthalene carboxylic acid, or tetrarin carboxylic acid and their derivatives. Benzoic acid is especially preferable.

(Polyhydric Alcohol Ester)

The molecular weight of the polyhydric alcohol ester used in the invention is not specifically limited, but is preferably from 300 to 1500, and more preferably from 350 to 750. The polyhydric alcohol ester with higher molecular weight is preferable in the retention property, and the polyhydric alcohol ester with lower molecular weight is preferable in water vapor transmission rate and its compatibility with cellulose ester.

The monocarboxylic acid for the preparation of the polyhydric alcohol ester in the invention may be used singly or as a mixture or two or more kinds thereof. All the hydroxy groups of the polyhydric alcohol may be esterified or a part of the hydroxy groups of the polyhydric alcohol may be esterified to remain a free hydroxyl group.

It is preferred that the polyhydric alcohol ester in the invention preferably has an aromatic ring and/or a cycloalkyl ring in the molecule. It is more preferred that the polyhydric alcohol ester in the invention has a total number of the aromatic ring and/or the cycloalkyl ring of not less than 3, that is, the polyhydric alcohol ester in the invention is one having three or more aromatic rings, one having three or more cycloalkyl rings, or one having three or more of aromatic rings and cycloalkyl rings. Herein, with respect to the aromatic ring, one condensed aromatic ring (for example, a naphthalene ring, or an anthracene ring) is one aromatic ring.

Examples of the polyhydric alcohol ester in the invention will be exemplified below.

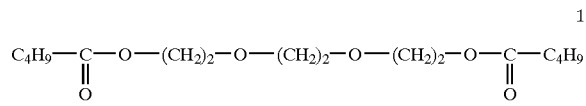

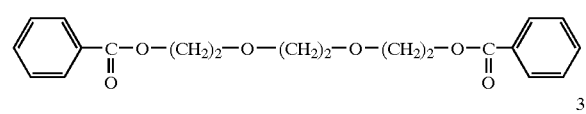

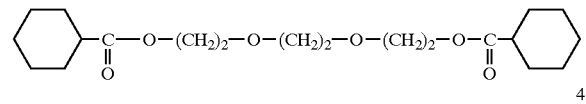

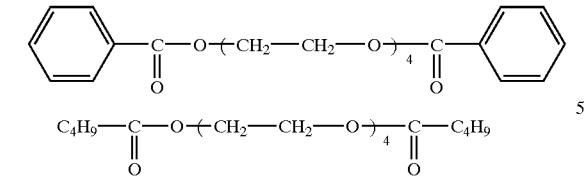

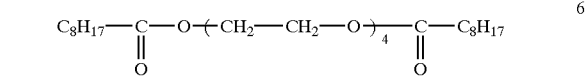

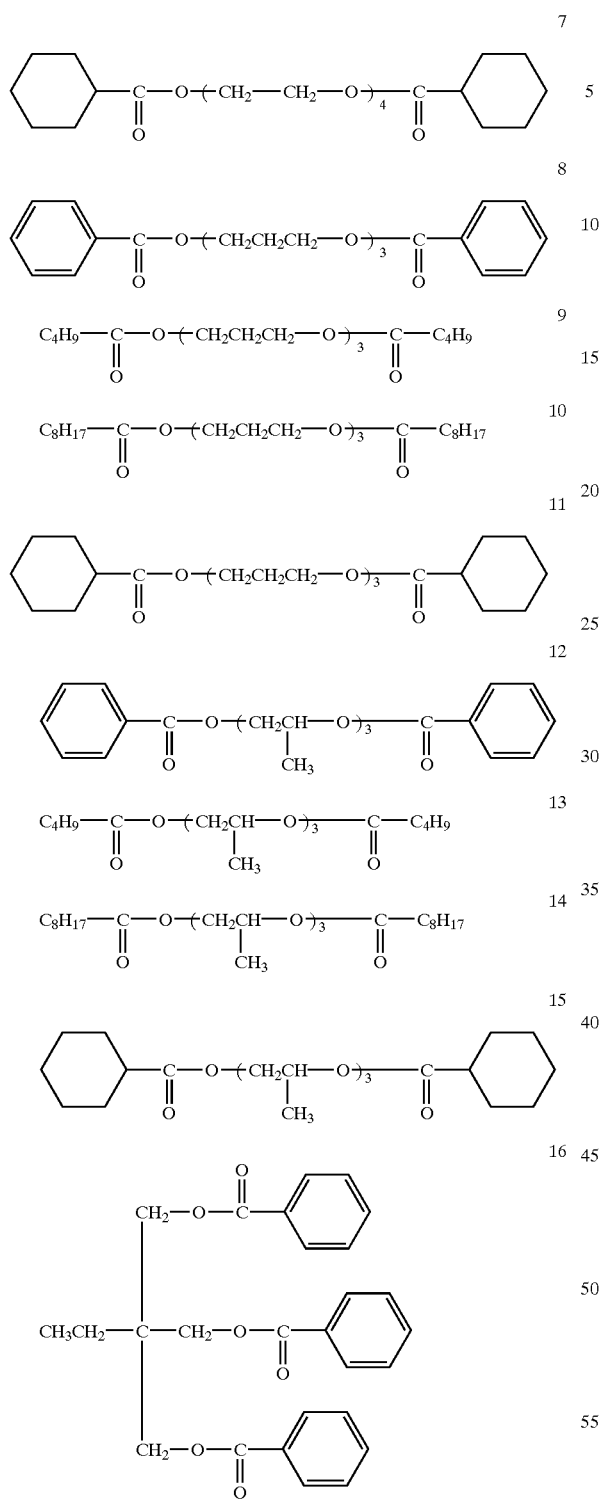
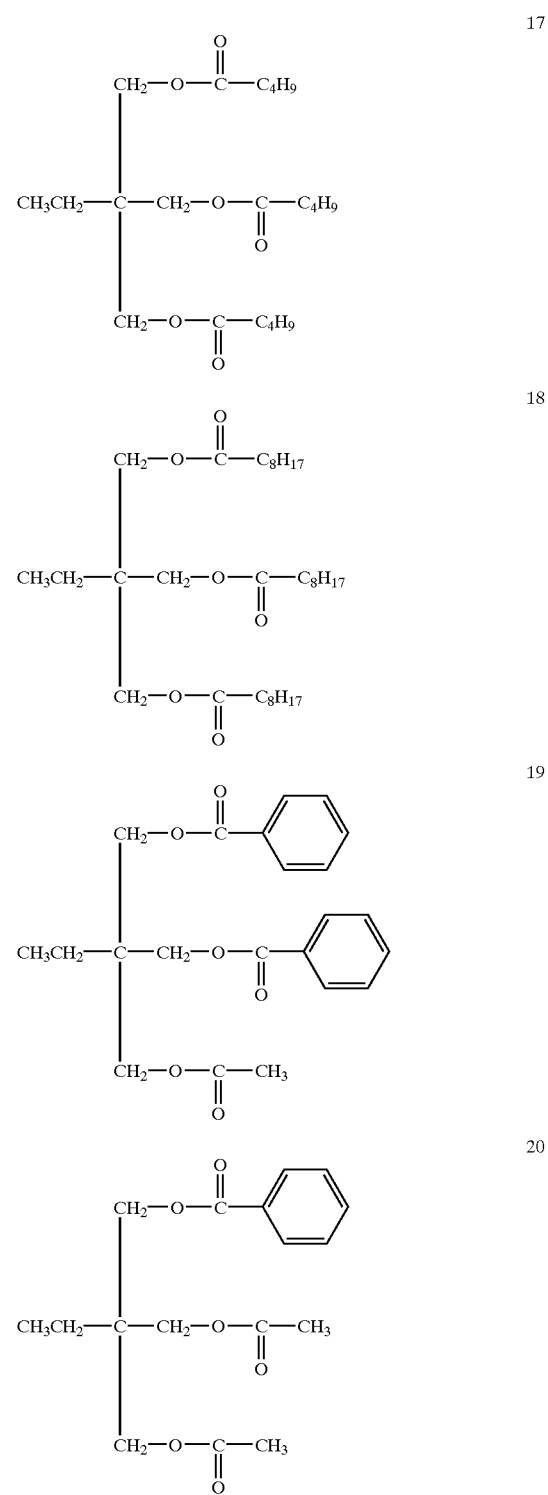

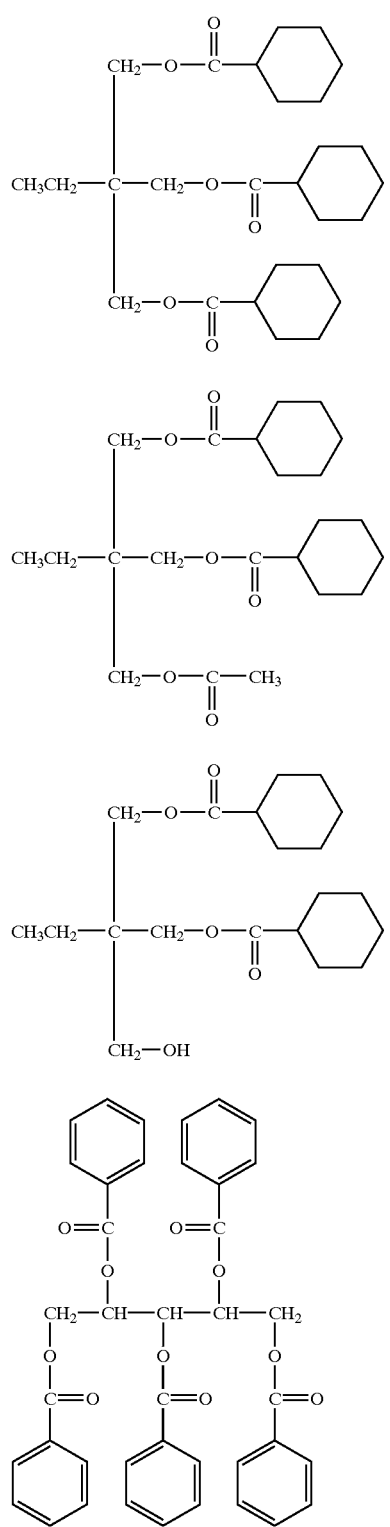
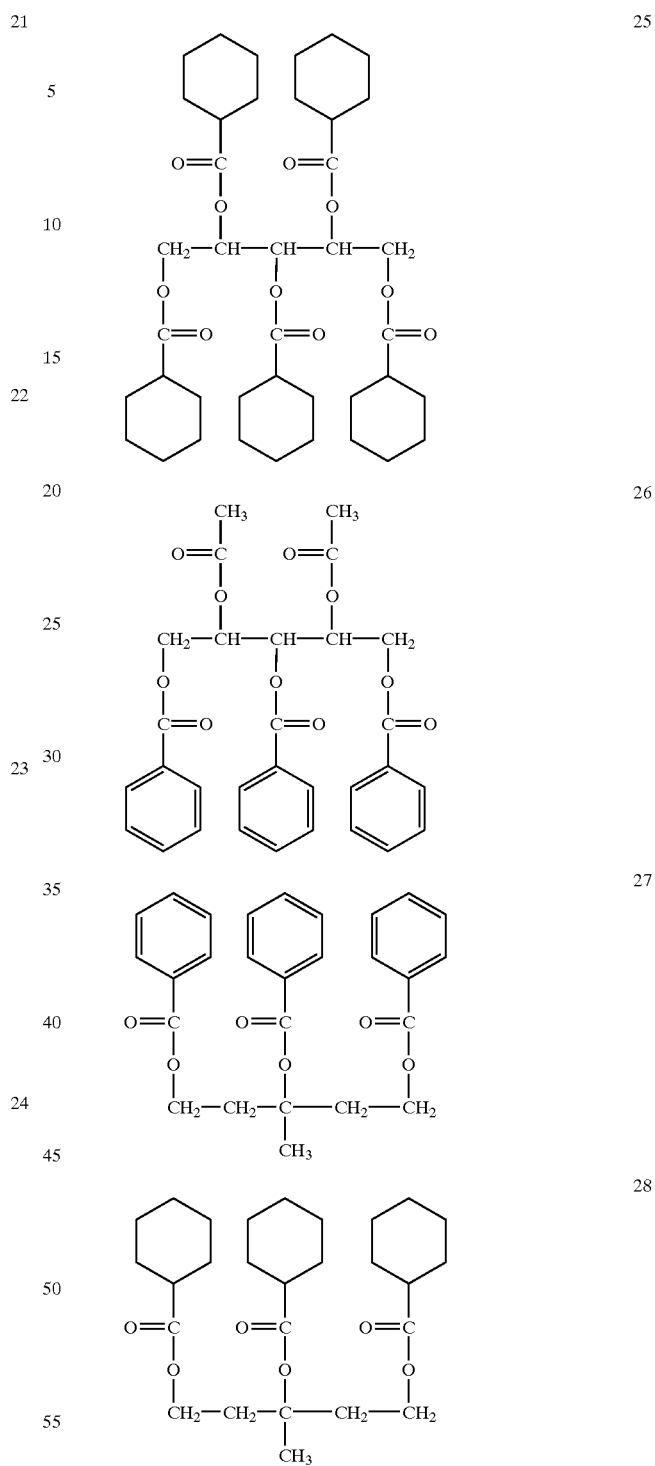

29

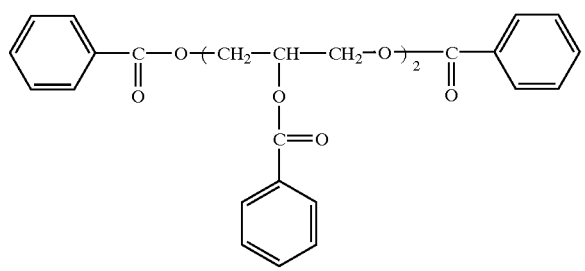

30

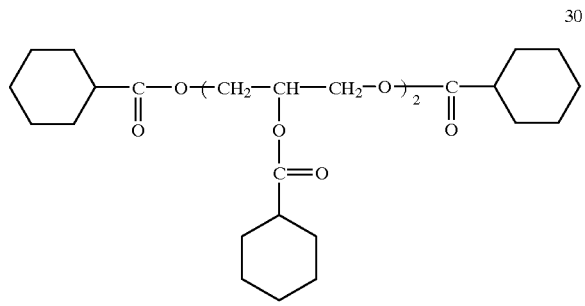

31

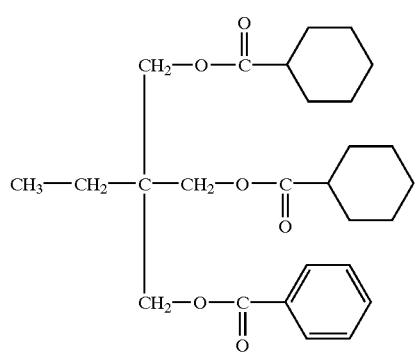

32

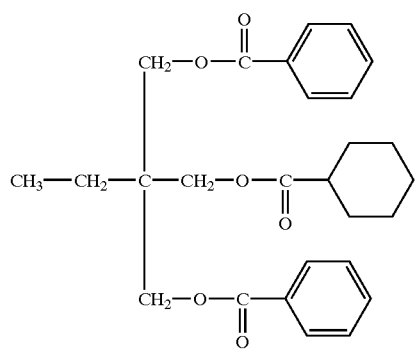

33

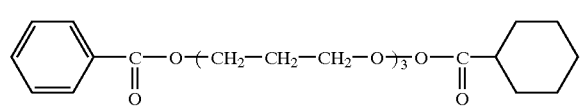

34

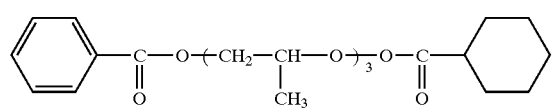

35

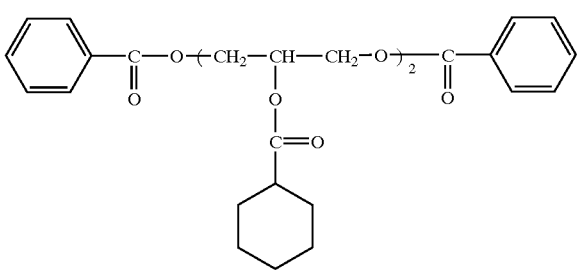

The addition amount of the polyhydric alcohol ester in the cellulose ester is preferably from 3 to 30% by weight, more preferably from 5 to 25% by weight, and most preferably from 5 to 20% by weight, based on the weight of cellulose ester.

(Cellulose Ester)

The cellulose ester used in the invention is preferably a lower fatty acid ester of cellulose. The lower fatty acid used in preparation of the lower fatty acid ester of cellulose implies a fatty acid having a carbon atom number of not more than 6. Examples of the lower fatty acid ester of cellulose include cellulose acetate, cellulose propionate, cellulose butyrate, and a mixed fatty acid ester of cellulose such as cellulose acetate propionate, or cellulose acetate butyrate as disclosed in Japanese Patent O.P.I. Publication Nos. 10-45804 and 8-231761 and U.S. Pat. No. 2,319,052. Of these lower fatty acid esters of celluloses, cellulose triacetate or cellulose acetate propionate is especially preferable.

The cellulose triacetate has a polymerization degree of preferably 250 to 400 and an average acetic acid value (acetic acid content) of preferably from 54.0 to 62.5%, and more preferably from 58.0 to 62.5%, in view of strength of the film.

The most preferable lower fatty acid ester of cellulose is one having an acyl group having a carbon atom number of from 2 to 4 as a substituent, and simultaneously satisfying the following formulae (I) and (II):

$$2.6 \leq X+Y \leq 3.0 \quad \text{formula (I)}$$

$$0 \leq X \leq 2.5 \quad \text{formula (II)}$$

wherein X represents an acetyl substitution degree, and Y represents a propionyl or butyryl substitution degree.

Among the cellulose esters, cellulose acetate propionate are more preferable, and cellulose acetate propionate satisfying $1.9 \leq X \leq 2.5$ and $0.1 \leq Y \leq 0.9$ is most preferable. Free hydroxyll groups exist at the portions, which are not substituted with an acyl group. These cellulose esters can be synthesized according to conventional synthetic methods.

In the invention, cellulose esters, which are synthesized from raw material such as cotton lint, a tree pulp or kenaf, can be used singly or in combination. It is especially preferred that cellulose ester synthesized from raw material such as cotton lint (hereinafter referred to also as lint) is used singly or in combination.

(Manufacturing Method of Cellulose Ester Film)

The manufacturing method of the cellulose ester film of the invention will be explained below.

The cellulose ester film of the invention is manufactured by casting on a support a dope in which cellulose ester is dissolved in a solvent, and drying. The dope optionally contains various kinds of additives.

It is preferable that the cellulose ester concentration of the dope is higher, since the load for drying the dope cast on a support is reduced. Too high concentration of the cellulose ester of the dope increases the filtration load at the filtration, resulting in lowering of filtration accuracy. In view of the above, the cellulose ester concentration of the dope is preferably 10 to 30% by weight, and more preferably 15 to 25% by weight.

The solvent used in the dope in the invention may be used singly, but is preferably used as a mixture solvent of a good solvent of cellulose ester and a poor solvent of cellulose ester, in view of productive efficiency. It is preferred that the good solvent content of the mixture solvent is preferably 70 to 98% by weight, and the poor solvent content of the mixture solvent is preferably 2 to 30% by weight.

In the invention, a good solvent is defined as a solvent alone capable of dissolving cellulose esters, and a poor solvent is defined as a solvent alone incapable of only swelling cellulose esters or incapable of dissolving cellulose esters. Therefore, whether a solvent is a good solvent or a poor solvent of cellulose esters depends on an average acetic acid value of cellulose ester used. For example, acetone is a good solvent of a cellulose ester with an average acetic acid value of 55%, but is a poor solvent of a cellulose ester with an average acetic acid value of 60%.

Examples of the good solvents used in the invention include an organic halogen-containing compound such as methylene chloride and dioxolane. The good solvents of cellulose acetate propionate include methylene chloride, acetone, and methyl acetate.

Examples of the poor solvent used in the invention include methanol, ethanol, n-butanol, and cyclohexane, acetone and cyclohexanone.

In preparation of the dope described above, cellulose ester is dissolved in a solvent out according to conventional processes, and the cellulose ester is preferably dissolved in a solvent with stirring under increased pressure at from the boiling point at atmospheric pressure of the solvent to a temperature at which the solvent is not boiled, since undissolved matters such as gelled lumps do not produce. A process is also preferable in which cellulose ester is mixed with a poor solvent to swell cellulose ester, and then a good solvent is added thereto to dissolve the cellulose ester.

The pressure application is carried out by incorporating to the vessel an inactive gas such as nitrogen with pressure or by increasing a solvent vapor pressure in the vessel by heating. Heating is preferably carried out outside the vessel, and a jacket type vessel is preferable, since heating temperature is easily controlled.

The heating temperature is preferably in the range of from the boiling point at ordinary pressure of a solvent used to a temperature at which the solvent is not boiled, in view of solubility of the cellulose ester. Too high heating temperature requires higher pressure, resulting in poor productive efficiency. The heating temperature is preferably in the range of from 45 to 120° C., more preferably from 60 to 110° C., and still more preferably from 70 to 105° C. The pressure applied is adjusted not to boil the solvent at a set temperature.

Next, the cellulose ester solution is filtered through an appropriate filter such as a filter paper. A filter medium for filtration is preferably smaller in an absolute filtration accuracy in order to remove undissolved materials. Too small absolute filtration accuracy is likely to clog the filter medium, and therefore, the filter medium for a cellulose ester solution or dope is one with an absolute filtration accuracy of preferably not more than 0.008 mm, more preferably from 0.001 to 0.008 mm, and still more preferably from 0.003 to 0.006 mm.

Materials of the filtration medium are not specifically limited, but are preferably plastics such as polypropylene or Teflon (R) or metals such as stainless steel with no falling off of the fabric.

Filtration of the dope is carried out employing a conventional method. Filtration of the dope is preferably carried out under increased pressure at from the boiling point at atmospheric pressure of the solvent to a temperature at which the solvent is not boiled, since increase of filtration pressure is small. The temperature at filtration is preferably from 45 to 120° C., more preferably from 45 to 70° C., and still more preferably from 45 to 55° C.

The filtration pressure is preferably lower. The filtration pressure is preferably not more than $1.6 \times 10^6$ Pa, more preferably $1.2 \times 10^6$ Pa, and most preferably not more than $1.0 \times 10^6$ Pa.

(Casting Process)

The support used in a dope casting process is a support in an endless belt form or in a drum form, the surface of which is specular. It is preferred that the surface temperature of the support at the casting process is in the range of from 0° C. to less than the boiling point of the solvent used. The higher the temperature is, more preferable, in view of the drying speed. However, too high temperature thereof may result in foaming or deterioration of flatness of the film. The surface temperature of the support is preferably 0 to 50° C., and more preferably 5 to 30° C. A method of controlling the temperature of the support is not specifically limited, but there is a method which blowing a hot or cold air to the support or a method which brings the support into contact with a hot water-containing vessel. The latter method is preferable since thermal conduction is efficiently conducted and a period of time taken for the support to be heated to a constant temperature is short. In the former method, a hot air having a temperature higher than an intended temperature may be used.

In order to obtain a good flatness of the support, the residual solvent content of the film, when the film is peeled from the support, is preferably 10 to 120%, more preferably 20 to 40% or 60 to 120%, and most preferably 20 to 30% or 70 to 110%.

In the invention, the residual solvent content of the film is represented by the following formula:

Residual solvent content=(Weight of film before heating treatment−weight of film after heating treatment)×100 (%)/(weight of film after heating treatment)

wherein the heating treatment is to heat the film at 115° C. for 1 hour.

In a drying process of the cellulose ester film, the cellulose ester film peeled from the support is further dried to give a residual solvent content in the film of preferably not more than 3 weight %, and more preferably not more than 0.5 weight %.

In the film drying process, the film is generally transporting on rollers or in a tenter while drying.

It is preferable in improving film dimensional stability that the film is dried while holding the width of the film or stretching the film, the film still having a relatively high residual solvent content, according to a tenter method, immediately after the film is peeled from the support. The means for drying the film is not specifically limited, but heated air, infrared light, heated rollers or micro waves are generally employed. The heated air is preferably used in view of its convenience. It is preferable that the drying temperature is gradually elevated in the range of from 40 to 140° C. It is more preferable in view of film dimensional stability that the drying temperature is gradually elevated in the range of from 50 to 140° C.

The less thickness of the cellulose ester film is preferable, since a polarizing plate or liquid crystal display each employing it is more thinned. However, too small thickness of the film deteriorates water vapor transmission rate or tear strength of the film. In order to overcome such a defect, the thickness of the cellulose ester film is preferably from 10 to 65 $\mu$m, more preferably from 20 to 60 $\mu$m, and still more preferably from 35 to 50 $\mu$m.

(Usage)

The cellulose ester film of the invention is preferably applied to a liquid crystal display material, in view of low water vapor transmission rate and excellent dimensional stability. The liquid crystal display material is a material used in a liquid crystal display, for example, a polarizing plate, a protective film of a polarizing plate, a phase difference film, a reflection plate, a viewing angle increasing film, an anti-glare film, a non-reflective film, or an antistatic film. The cellulose ester film of the invention is especially preferably applied to a polarizing plate or a protective film of a polarizing plate.

A polarizing plate can be prepared according to conventional methods. There is, for example, a method in which the cellulose ester film of the invention is subjected to an alkali saponification, and the resulting film is adhered through an aqueous completely saponified polyvinyl alcohol solution to both surfaces of a polarizing film which has been prepared by immersing a polyvinyl alcohol film in an iodine solution, and stretching the film. The alkali saponification refers to treatment in which the cellulose ester film is immersed in a strong alkali solution at high temperature in order to enhance wettability of the film to an aqueous adhesive and provide good adhesion to the film.

In the invention, the smaller a retardation $R_0$ (nm) in plane of the cellulose ester film obtained above is, the better. The retardation $R_0$ (nm) in plane is preferably not more than 100 nm, more preferably not more than 10 nm, and most preferably not more than 5 nm. When the cellulose ester film is used as a phase difference film, the $R_0$ (nm) is preferably 30 to 1000 nm.

In the invention, measuring three dimensional refractive indices at a wavelength 590 nm of the cellulose ester film through an automatic birefringence meter and obtaining a delayed phase angle $\theta_1$ and refractive indices Nx and Ny, a retardation in plane $R_0$ of a cellulose ester film can be computed from the following formula:

$$R_0=(Nx-Ny)\times d$$

wherein Nx represents the refractive index in the direction parallel to the mechanical direction (corresponding to the longitudinal direction) of the film, Ny represents the refractive index in the direction perpendicular to the mechanical direction of the film, and d represents the thickness (nm) of the film.

It is preferred in the invention that an angle $\theta_0$ of the mechanical direction of the film with respect to the delayed phase axis direction is more approximate to 0°, +90° or −90°. In this case, when such a cellulose ester film is used as a polarizing plate protective film, it contributes to improvement of polarization degree of the polarizing plate. The delayed phase axis herein referred to implies the direction providing the maximum refractive index in plane of the film.

Further, it is preferable that $\theta_1$ (radian) (obtained from $\theta_0$°) and a retardation in plane $R_0$ satisfy the following formula:

$$P \leq 1-\sin^2(2\theta_1)\cdot\sin^2(\pi R_0/\lambda)$$

In the above formula, P is preferably not less than 0.99900, more preferably not less than 0.99990, still more preferably not less than 0.99995, and most preferably not less than 0.99999. $\lambda$ represents the wavelength of light used for measuring the three dimensional refractive indices for obtaining $R_0$ and $\theta_1$, and is in the range of from 380 to 650 nm. It is preferred that when $\lambda$ is 590 nm, the above formula is satisfied, and it is more preferred that when $\lambda$ is not less than 400 nm, the above formula is satisfied.

The present invention will be explained in detail below.

(Additives)

The cellulose ester film of the invention optionally contains additives such as a plasticizer, an ultraviolet absorbent, a matting agent and a dye.

In the invention, the polyhydric alcohol ester and a conventional plasticizer can be used in combination. The addition amount of the conventional plasticizer is preferably zero or less when the polyhydric alcohol ester is not used. The addition amount of the conventional plasticizer in the cellulose ester film is preferably 0 to 30% by weight, more preferably 0 to 25% by weight, and still more preferably 0 to 20% by weight.

The plasticizer used in the invention is not specifically limited, but is preferably a phosphate plasticizer, a phthalate plasticizer or a glycolate plasticizer. Examples of the phosphate plasticizer include triphenyl phosphate, tricresyl phosphate, cresyldiphenyl phosphate, octyldiphenyl phosphate, diphenylbiphenyl phosphate, trioctyl phosphate, or tributyl phosphate. Examples of the phthalate plasticizer include diethyl phthalate, dimethoxyethyl phthalate, dimethyl phthalate, dioctyl phthalate, dibutyl phthalate, or di-2-ethylhexyl phthalate. Examples of the glycolate plasticizer include butyl phthalyl butyl glycolate, ethyl phthalyl ethyl glycolate, or methyl phthalyl ethyl glycolate. These plasticizers may be used singly or in combination.

The UV absorbent used in the invention is preferably a UV absorbent which has excellent absorption of ultraviolet light having a wavelength of 370 nm or less, and has reduced absorption of visible light having a wavelength of 400 nm or more in clearly displaying a liquid crystal image. The UV absorbents have a transmittance at 370 nm of preferably not more than 10%, more preferably not more than 5%, and most preferably not more than 2%.

The UV absorbent added to the cellulose ester film of the invention is preferably a UV absorbent having two or more aromatic rings in its molecular structure.

The UV absorbents used in the invention are not specifically limited, and examples of the UV absorbents include an oxybenzophenone compound, a benzotriazole compound, a salicylic acid ester compound, a benzophenone compound, a cyanoacrylate compound, a nickel complex compound, and inoraganic powder. As UV absorbents preferably used in the invention, the benzotriazole or benzophenone type UV absorbent is preferably used which has high transparency, and minimizes deterioration of a polarizing plate or a liquid crystal. The benzotriazole type UV absorbent is especially preferably used which minimizes undesired coloration. Typical examples of the UV absorbents preferably used in the invention include TINUBIN 109, 171, 326, 327, and 328 (each produced by Ciba Specialty Chemicals Co., Ltd.), and the present invention is not limited thereto.

These UV absorbent can be used singly or as a mixture of two or more kinds thereof. As a UV absorbent, a polymeric UV absorbent is also preferably used. The polymeric UV absorbents disclosed in Japanese Patent O.P.I. Publication No. 6-148430 are also especially preferably used.

The UV absorbents may be added to a dope in the form of a solid or in the form of a solution in which the UV absorbents are dissolved in an organic solvent such as alcohol, methylene chloride or dioxolane. A material such as organic powder, which is insoluble in a solvent, is dispersed in a mixture of an organic solvent and cellulose ester employing a dissolver or a sand mill, and added to a dope.

The UV absorbent addition amount varies due to kinds of the UV absorbent used or conditions in use, but when the thickness of the cellulose ester film is 30 to 200 μm, the addition amount is preferably 0.5 to 4.0% by weight, and more preferably 0.6 to 2.0% by weight based on the cellulose ester weight.

The cellulose ester film of the invention optionally contains fine particles of silicon oxide as a matting agent. The matting agent particles surface treated with an organic compound are preferable in providing a reduced haze of the film.

Examples of the organic compound used in the surface treatment include halogenated silanes, alkoxysilanes (especially, methylsilane), silazanes, and siloxanes. Fine particles having a larger average particle diameter has a high matting effect, and fine particles having a smaller average particle diameter has a good transparency. In the invention, the primary order particles of the fine particles have an average primary particle diameter of preferably 5 to 50 nm, and more preferably 7 to 20 nm.

The silicon oxide fine particles are not specifically limited, and include, for example, AEROSIL 200, 200V, 300, R972, R972V, R972CF, R974, R202, R805, R812, OX50, or TT600 (each produced by Nihon Aerosil Co., Ltd.), and the silicon oxide particles are preferably AEROSIL 200, 200V, R972, R972V, R974, R202, R805 or R812.

Various additives may be added by batch to a dope containing cellulose ester, and in-line added to the dope in the form of solution containing the additives. Particularly with respect to a matting agent, a part or all of matting agent are preferably in-line added to the dope in order to reduce the load on a filter used.

When an additive solution is in-line added to the cellulose ester dope, the additive solution preferably contains a small amount of cellulose ester, in order to increase compatibility of the additive solution with the dope. The cellulose ester content of the additive solution is preferably from 1 to 10 parts by weight, and preferably from 3 to 5 parts by weight based on the 100 parts by weight of the solvent.

The dispersion method of a matting agent is not specifically limited, but the use of a high pressure dispersion apparatus such as a dissolver can provide a dispersion in which the matting agent is dispersed in fine particles. The dispersion may be mixed with a cellulose ester. In order to mix a dope in which cellulose ester is dissolved in a solvent with a solution containing various additives and a small amount of cellulose ester, an in-line mixer such as a static mixer (produced by Toray Engineering Co., Ltd.) or SWJ (a Toray static pipe mixer Hi-Mixer) is preferably used. When the in-line mixer is used, the resulting mixture is preferably concentrated under high pressure, and a pressure vessel used is not specifically limited as long as it is resistant to high pressure, and heating and stirring under increased pressure are possible. The pressure vessel is preferably equipped with gauges such as a thermometer and a pressure meter.

EXAMPLES

The invention will be detailed according to the following examples, but is not limited thereto.

Example 1

| (Preparation of a dope) (Dope composition) | |
|---|---|
| Cellulose triacetate (lint, with an acetic acid value of 62.0% | 160 kg |
| Dipropylene glycol dibenzoate | 40 kg |
| Methylene chloride | 770 kg |
| Ethanol | 65 kg |

The above dope composition was incorporated in a sealed vessel, and stirred to obtain a dope. The resulting dope was uniformly cast at 33° C. with a width of 1500 mm on a stainless steel belt to form a film, employing a belt casting apparatus. The temperature of the stainless steel belt was controlled to be 25° C. The cast film was evaporated until the residual solvent amount reached 25 percent, and peeled from the stainless steel belt at a peeling tension of 127 N/m. The peeled cellulose triacetate film was dried while transported on many rollers in a dry zone. Thus, cellulose triacetate film sample 101 was prepared. The thickness of sample 101 was 40 μm.

Cellulose triacetate film samples 102 through 118 were prepared in the same manner as in cellulose triacetate film sample 1 above, except that the additives as described in Table 1 were added instead of dipropylene glycol dibenzoate. Cellulose triacetate film sample 119 was prepared in the same manner as in sample 105 above, except that 0.8 g of each of TINUVIN 109, 171 and 326 (each produced by Ciba Specialty Chemicals Co., Ltd.) were further added to the dope.

With respect to samples 101 through 119, water vapor transmission rate and retention property were measured. With respect to samples 101 through 114, retardation $R_0$ and delayed phase axis angle $\theta_1$ were measured, and degree of polarization was computed from the measured values. The results are shown in Table 1.

(Water Vapor Transmission Rate)

Water vapor transmission rate was measured according to a method described in JIS Z 0208 under conditions of 25° C. and 90%.

Water vapor transmission rate is preferably from 20 to 260 (g/m²·24 hours), more preferably from 20 to 200 (g/m²·24 hours), and still more preferably from 20 to 150 (g/m²·24 hours).

(Retention Property)

Each sample was cut to a size of 10×10 cm². The cut sample was allowed to stand at 23° C. and at 55% RH for one day, and then weighed. The resulting sample was subjected to heat treatment at 80° C. and at 90% RH for two weeks. After that, the sample was again allowed to stand at 23° C. and at 55% RH for one day, and then weighed. The retention property is represented by the following formula:

Retention property (%)=(Sample weight before heat treatment−Sample weight after heat treatment)×100/(Sample weight before heat treatment) (Retardation $R_0$, Delayed phase axis angle $\theta_1$)

Refractive indices at wavelength 590 nm in the three axis directions of samples 101 through 114 were measured at 23° C. and 55% RH by means of a birefringence meter KOBRA-21ADH (produced by Oji Keisokukiki Co., Ltd.), and delayed phase axis angle $\theta_0$ (°) and Nx, Ny, and Nz were determined. The retardation in plane $R_0$ was computed from the formula described earlier.

Further, a degree of polarization was computed ($\theta_1$ (radian) was obtained from $\theta_0°$) from the following formula:

$$P=1-\sin^2(2\theta_1)\cdot\sin^2(\pi R_0/\lambda)$$

wherein $\lambda$ represents a wavelength (nm) used for the measurement, and is 590 nm.

In the above formula, P is preferably not less than 0.9990, more preferably not less than 0.9999, still more preferably not less than 0.99995, and most preferably not less than 0.99999.

immersing and stretching a polyvinyl alcohol film in an iodine solution. Thus, a polarizing plate sample was obtained.

The polarizing plates were peeled from both sides of the liquid crystal cell of a 15 TYPE TFT color liquid crystal display LA-1529HM (produced by NEC Co., Ltd.). The polarizing plate sample prepared above was cut to be in accordance with the size of the liquid crystal cell. Subsequently, each of the polarizing plate samples prepared employing cellulose triacetate film samples 101 through 114 and sample 119 prepared in Example 1 were superposed on

TABLE 1

| Sample No. | Polyhydric alcohol esters Kinds | Addition amount (g) | Additives Kinds | Addition amount (g) | Remarks | Water vapor transmission rate (g/m² · 24 hours) | Retention property (%) | $R_0$ | $\theta_0$ (°) | $\theta_1$ (radian) | p | Remarks |
|---|---|---|---|---|---|---|---|---|---|---|---|---|
| 101 | Dipropylene glycol dibenzoate | 40 | — | — | Inv. | 175 | 0.9 | 1.6 | 6.0 | 0.10 | 0.9993 | Inv. |
| 102 | Tripropylene glycol dibenzoate | 40 | — | — | Inv. | 168 | 0.1 | 1.6 | 7.0 | 0.12 | 0.9991 | Inv. |
| 103 | 1,3-Dibutylene glycol dibenzoate | 40 | — | — | Inv. | 195 | 0.6 | 1.7 | 6.0 | 0.10 | 0.9992 | Inv. |
| 104 | Tetraethylene glycol dibenzoate | 40 | — | — | Inv. | 198 | 0.9 | 2.5 | 4.0 | 0.07 | 0.9993 | Inv. |
| 105 | Trimethylolpropane tribenzoate | 40 | — | — | Inv. | 165 | 0.0 | 2.8 | 3.0 | 0.05 | 0.9996 | Inv. |
| 106 | Trimethylolpropane triacetate | 40 | — | — | Inv. | 175 | 0.9 | 2.0 | 5.0 | 0.09 | 0.9993 | Inv. |
| 107 | Trimethylolpropane tripropioate | 40 | — | — | Inv. | 173 | 0.6 | 1.9 | 6.0 | 0.10 | 0.9990 | Inv. |
| 108 | Ester A | 40 | — | — | Inv. | 168 | 0.1 | 1.8 | 6.0 | 0.10 | 0.9991 | Inv. |
| 109 | Ester B | 40 | — | — | Inv. | 170 | 0.0 | 1.7 | 6.0 | 0.10 | 0.9992 | Inv. |
| 110 | Ester C | 40 | — | — | Inv. | 165 | 0.1 | 1.6 | 6.0 | 0.10 | 0.9993 | Inv. |
| 111 | Ester D | 40 | — | — | Inv. | 185 | 0.1 | 1.8 | 5.0 | 0.09 | 0.9994 | Inv. |
| 112 | Ester E | 40 | — | — | Inv. | 188 | 0.2 | 1.7 | 6.0 | 0.10 | 0.9992 | Inv. |
| 113 | Ester F | 40 | — | — | Inv. | 195 | 0.1 | 1.8 | 6.0 | 0.10 | 0.9991 | Inv. |
| 114 | Ester G | 40 | — | — | Inv. | 198 | 0.1 | 1.9 | 5.0 | 0.09 | 0.9993 | Inv. |
| 115 | Triphenyl phosphate | 40 | — | — | Comp. | 251 | 3.6 | — | — | — | — | Comp. |
| 116 | Ethylphthalyl ethyl glycolate | 40 | — | — | Comp. | 230 | 5.6 | — | — | — | — | Comp. |
| 117 | Triethyl acetylcitrate | 40 | — | — | Comp. | 283 | 5.3 | — | — | — | — | Comp. |
| 118 | Tributyl acetylcitrate | 40 | — | — | Comp. | 193 | 4.5 | — | — | — | — | Comp. |
| 119 | trimethylolpropane tribenzoate | 40 | TINUVIN 109 | 0.8 | Inv. | 145 | 0.0 | — | — | — | — | Inv. |
|  |  |  | TINUVIN 171 | 0.8 |  |  |  |  |  |  |  |  |
|  |  |  | TINUVIN 326 | 0.8 |  |  |  |  |  |  |  |  |

Inv.: Inventive;
Comp.: Comparative
Ester A: Mixed ester of trimethylolpropane and acetic acid/benzoic acid (1/1);
Ester B: Ester of trimethylolpropane and cyclohexane carboxylic acid;
Ester C: Mixed ester of trimethylolpropane and acetic acid/cyclohexane carboxylic acid (1/1);
Ester D: Ester of 3-methylpentane-1,3,5-triol and benzoic acid;
Ester E: Ester of 3-methylpentane-1,3,5-triol and cyclohexane carboxylic acid;
Ester F: Ester of xylitol and benzoic acid;
Ester G: Ester of xylitol and cyclohexane carboxylic acid As is apparent from Table 1 above, inventive cellulose triacetate film samples provided a low water vapor transmission rate, and excellent retention property as compared with the comparative cellulose triacetate film samples.

Example 2

Each of cellulose triacetate film samples 101 through 114 and sample 119 prepared in Example 1 was subjected to an alkali saponification, and adhered through an aqueous completely saponified polyvinyl alcohol solution to both surfaces of a polarizing film which had been prepared by both sides of the liquid crystal cell so that their polarizing directions were in accordance with the original one before peeled and perpendicular to each other to obtain a liquid crystal display panel. The resulting liquid crystal panel was installed in the color liquid crystal display, and the cellulose triacetate film sample employed in the polarizing plate was evaluated.

As a result, it was confirmed that the liquid crystal display panel employing the inventive cellulose triacetate film sample exhibited an excellent displaying property providing a high contrast image, and the cellulose ester film according to the invention was excellent as a polarizing plate for an image displaying apparatus such as a liquid crystal display.

Effects of the Invention

The present invention can provide a cellulose ester film providing an excellent water vapor transmission rate and an excellent retention property.

What is claimed is:

1. A cellulose ester film comprising a polyhydric alcohol ester in an amount of 5 to 20% by weight based on the weight of cellulose ester, the polyhydric alcohol ester being an ester of one or more kinds of monocarboxylic acids with an aliphatic polyhydric alcohol, wherein the cellulose ester film has a water vapor transmission rate of from 20 to 260 g/m²·24 hours measured under conditions of 25° C. and 90% RH (relative humidity), and the polyhydric alcohol ester has a molecular weight of from 300 to 1500, and wherein the cellulose ester film has a retention property of from 0.0 to 2.0%.

2. The cellulose ester film of claim 1, wherein the monocarboxylic acid has an aromatic ring or a cycloalkyl ring in its molecular structure.

3. The cellulose ester film of claim 1, wherein the aliphatic polyhydric alcohol has a hydroxyl group number of from 2 to 20.

4. The cellulose ester film of claim 1, wherein the cellulose ester film has a thickness of from 10 to 65 μm.

5. The cellulose ester film of claim 1, wherein the aliphatic polyhydric alcohol is represented by the following formula (1):

$$(R_1)-(OH)n \qquad \text{formula (1)}$$

wherein $R_1$ represents an n-valent aliphatic group; and n represents an integer of not less than 2.

6. The cellulose ester film of claim 5, wherein the n-valent aliphatic group is selected from an alkylene group, an alkenylene group, an alkynylene group, a cycloalkylene group and an alkanetriyl group.

7. A cellulose ester film comprising a polyhydric alcohol ester having an aromatic ring or a cycloalkyl ring in the molecule, which is an ester of one or more kinds of monocarboxylic acids with an aliphatic polyhydric alcohol, a total number of the aromatic ring or the cycloalkyl ring being not less than 3, wherein the cellulose ester film has a water vapor transmission rate of from 20 to 260 g/m²·24 hours measured under conditions of 25° C. and 90% RH (relative humidity), and the polyhydric alcohol ester has a molecular weight of from 300 to 1500, and wherein the cellulose ester film has a retention property of from 0.0 to 2.0%.

8. The cellulose ester film of claim 7, wherein the polyhydric alcohol ester has an aromatic ring and a cycloalkyl ring in the molecule, and a total number of the aromatic ring and the cycloalkyl ring being not less than 3.

9. A polarizing plate comprising a polarizing film and a cellulose ester film provided on both surfaces of the polarizing film, the cellulose ester film comprising a polyhydric alcohol ester, which is an ester of one or more kinds of monocarboxylic acids with an aliphatic polyhydric alcohol, wherein the cellulose ester film has a water vapor transmission rate of from 20 to 260 g/m²·24 hours measured under conditions of 25° C. and 90% RH (relative humidity), and the polyhydric alcohol ester has a molecular weight of from 300 to 1500, and wherein the cellulose ester film has a retention property of from 0.0 to 2.0%.

10. The polarizing plate of claim 9, wherein the cellulose ester film is subjected to an alkali saponification.

* * * * *